US008467549B2

(12) United States Patent
Hori

(10) Patent No.: US 8,467,549 B2
(45) Date of Patent: Jun. 18, 2013

(54) AUDIO INFORMATION PROCESSING APPARATUS AND AUDIO INFORMATION PROCESSING METHOD

(75) Inventor: Taizo Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1337 days.

(21) Appl. No.: 11/838,611

(22) Filed: Aug. 14, 2007

(65) Prior Publication Data

US 2008/0051920 A1 Feb. 28, 2008

(30) Foreign Application Priority Data

Aug. 28, 2006 (JP) ................................ 2006-230215

(51) Int. Cl.
*G06F 17/00* (2006.01)

(52) U.S. Cl.
USPC ................. 381/119; 381/18; 381/92; 381/26; 381/22; 381/27; 381/11; 381/17; 381/19; 381/20; 381/21; 381/347; 381/348; 700/94

(58) Field of Classification Search
USPC ............... 381/119, 18, 92, 26, 22, 27, 11, 17, 381/19–21, 347, 348; 700/94
See application file for complete search history.

(56) References Cited

U.S. PATENT DOCUMENTS

| | | | | |
|---|---|---|---|---|
| 4,489,442 | A * | 12/1984 | Anderson et al. | 381/81 |
| 6,016,295 | A * | 1/2000 | Endoh et al. | 369/47.16 |
| 6,137,887 | A * | 10/2000 | Anderson | 381/92 |
| 6,219,426 | B1 * | 4/2001 | Daniels et al. | 381/307 |
| 6,507,659 | B1 * | 1/2003 | Iredale et al. | 381/26 |
| 6,681,018 | B1 * | 1/2004 | Asakura et al. | 381/18 |
| 7,212,872 | B1 * | 5/2007 | Smith et al. | 700/94 |
| 7,224,385 | B2 * | 5/2007 | Shinada | 348/207.99 |
| 7,456,875 | B2 * | 11/2008 | Kashiwa | 348/239 |
| 2003/0161485 | A1 * | 8/2003 | Smith | 381/92 |
| 2004/0175001 | A1 * | 9/2004 | Sakagami et al. | 381/27 |
| 2006/0198540 | A1 * | 9/2006 | Jonson | 381/119 |

FOREIGN PATENT DOCUMENTS

| | | | | |
|---|---|---|---|---|
| JP | 03-266599 | A | | 11/1991 |
| JP | 07-162384 | A | | 6/1995 |
| JP | 2000-299842 | A | * | 10/2000 |
| JP | 2000354291 | A | * | 12/2000 |
| JP | 2002232988 | A | * | 8/2002 |
| JP | 2004-535736 | A | | 11/2004 |
| JP | 2005-328315 | | * | 11/2005 |
| JP | 2005322953 | A | * | 11/2005 |
| JP | 2005328314 | A | * | 11/2005 |
| JP | 2005-341073 | A | | 12/2005 |
| JP | 2006-064763 | A | | 3/2006 |

OTHER PUBLICATIONS

Julstrom et al, Direction Sensitive Gating A new Approach to Automatic Mixing, Mar. 15-18, 1983 Audio Engineering Society, 73 rd Convention.*

* cited by examiner

*Primary Examiner* — Davetta W. Goins
*Assistant Examiner* — Kuassi Ganmavo
(74) *Attorney, Agent, or Firm* — Canon USA, Inc., IP Division

(57) ABSTRACT

An audio information processing apparatus for processing input audio information is adapted to input an audio signal composed of front area audio information that should be input to a front speaker and rear area audio information that should be input to a plurality of speakers. A mixer is adapted to mix the rear area audio information in accordance with an instruction from an instruction circuit.

14 Claims, 12 Drawing Sheets

AUDIO INFORMATION PROCESSING APPARATUS AND AUDIO INFORMATION PROCESSING METHOD

BACKGROUND OF THE INVENTION

1. Field of the Invention

The present invention relates to an audio information processing apparatus and an audio information processing method.

2. Description of the Related Art

Up to now, as an audio system, for example, systems corresponding to multi channels represented by a 5.1 ch surround (Dolby Digital) have been widely used. DOLBY and DOLBY DIGITAL are trademarks of Dolby Laboratories Licensing Corporation, USA.

For example, in a case of a 5.1 ch surround system, speakers corresponding to six-audio channels including a front left channel (FL), a front right channel (FR), a front center channel (FC), a sub woofer channel (SW), a rear left channel (RL), and a rear right channel (RR) are installed at appropriate positions so that an audio with realistic sensation can be output.

On the other hand, in recent years, an electronic device such as a digital camera or a digital video camera has been remarkably developed. In the digital camera or the digital video camera, various recording media such as a magnetic tape, a hard disk drive, a recordable optical disc, and a semiconductor memory are now being used. In particular, along with an increase in capacity of the recording media, large volume data can be recorded therein. Thus, for example, a digital camera or a digital video camera equipped with the 5.1 ch surround system has been proposed.

For example, Japanese Patent Laid-Open No. 2000-299842 discloses a method of generating a multi channel surround audio on the basis of audios collected from a plurality of microphones to record the multi channel surround audio in a video tape or a video disk.

Also, Japanese Patent Laid-Open No. 2005-341073 discloses an apparatus for synthesizing an audio from a rear center channel microphone with audios collected from four front and rear channel microphones by way of addition, subtraction, or the like.

Incidentally, FIG. 11 illustrates a polar pattern of an audio recorded in the video camera for recording 5.1 ch surround audio, for example. The polar pattern has directionality. If the video camera is panned during image pickup, the recorded audio is affected by this panning.

For example, during normal shooting, when the image pickup is performed while viewing an electronic view finder, a positional relation between the camera and a photographer is as illustrated in a schematic diagram of FIG. 12. FIG. 12 illustrates a positional relation between the camera and the photographer in a horizontal plane. At this time, the video camera and a mouth of the photographer have substantially the same relative positional relations. Thus, even when the video camera is panned, the recording is not affected by the panning.

However, when the video camera is placed on a tripod stand and image pickup is performed along with a narration while observing a liquid crystal monitor, the positional relation is established as illustrated in a schematic diagram of FIG. 13. FIG. 13 illustrates a positional relation between the camera and the photographer in a horizontal plane. When the camera is panned with the positional relation illustrated in FIG. 13, a narration audio from the photographer in the rear area who is not appearing in this scene is recorded nonuniformly in left and right sides. As a result, the audio is extremely hard to hear at the time of reproduction with unpleasant sensation.

SUMMARY OF THE INVENTION

The present invention has been made in view of the above-described problems to provide an information processing apparatus for suppressing unpleasant sensation of an audio from a rear area.

According to an aspect of the present invention, an audio information processing apparatus for processing input audio information includes an input unit configured to input an audio signal composed of front area audio information that should be input to a front speaker and rear area audio information that should be input to a plurality of speakers; an instruction circuit configured to issue an instruction to mix the audio information; and a mixer for the rear area audio information in accordance with the instruction from the instruction circuit.

According to another aspect of the present invention, an audio information processing method of processing input audio information, includes inputting an audio signal composed of front area audio information that should be input to a front speaker and rear area audio information that should be input to a plurality of speakers; issuing an instruction to mix the audio information; and mixing the rear area audio information in accordance with the issued instruction.

According to the present invention, in accordance with the instruction, the rear area audio information is mixed, and therefore, for example, the rear area audio obtained when the camera is panned can be localized in the rear area.

Other aspects and advantages besides those discussed above shall be apparent to those skilled in the art from the description of the embodiments of the present invention which follows.

DESCRIPTION OF THE EMBODIMENTS

In the description, reference is made to accompanying drawings, which form a part thereof, and which illustrate an example of the invention. Such examples, however, is not exhaustive of the various embodiments of the invention, and therefore reference is made to the claims which follow the description for determining the scope of the invention.

First Exemplary Embodiment

Figure 1:
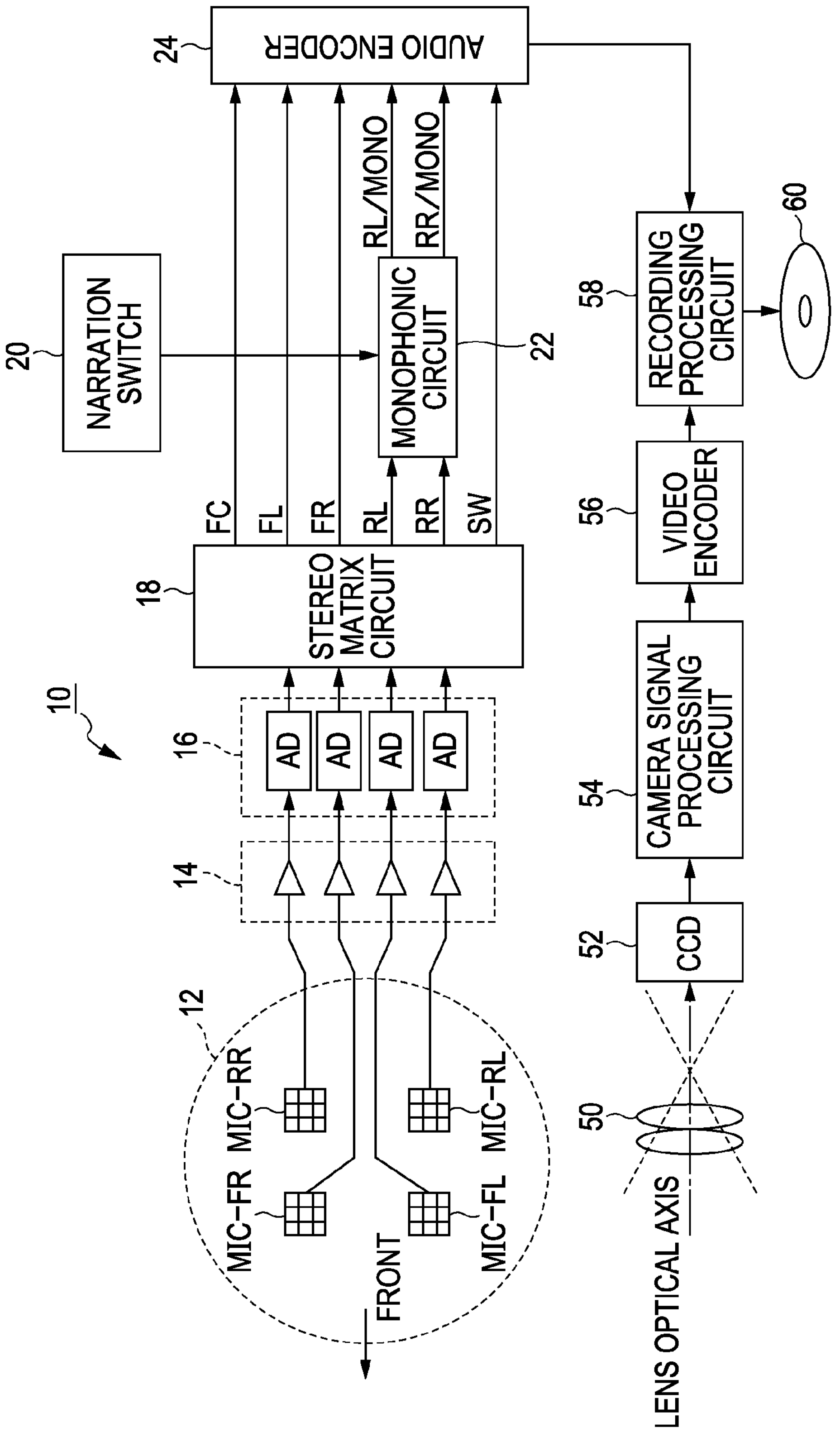
FIG. 1 is a schematic configuration block diagram of an example image pickup apparatus according to a first embodiment of the present invention.
Figure 2:
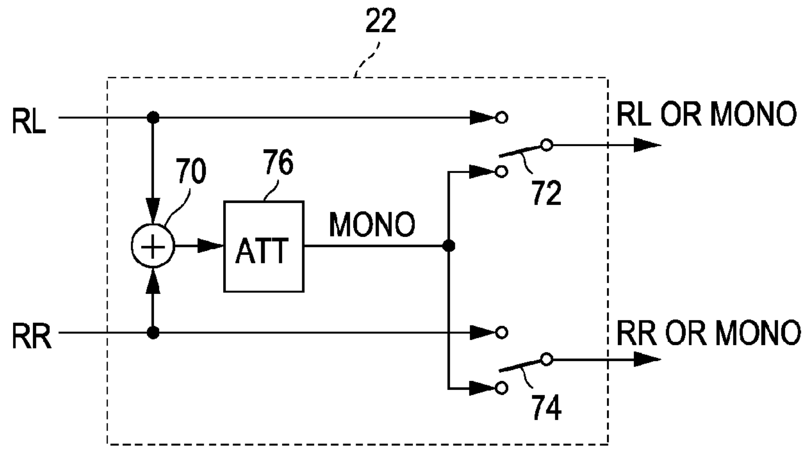
FIG. 2 is a block diagram of an example monophonic circuit according to the first embodiment.

FIG. 1 is a schematic configuration block diagram of an image pickup apparatus according to a first embodiment of the present invention and FIG. 2 is a schematic configuration block diagram of a monophonic circuit 22 according to the first embodiment.

In FIG. 1, an image pickup apparatus 10 is provided with, as components related to audio data, a microphone group 12, a microphone amplifier 14, an AD converter 16, a stereo matrix circuit 18, a narration switch 20, the monophonic circuit 22, and an audio encoder 24. The image pickup apparatus 10 is provided with, as components related to image data, lenses 50, a CCD (Charge Coupled Device) image pickup element 52, a camera signal processing circuit 54, and a video encoder 56. The image pickup apparatus 10 is further provided with a recording processing circuit 58 for recording the image data and the audio data in a recording medium 60.

First, a flow of the audio data will be described. The microphone group 12 is composed of four microphone elements for collecting audios from the front and rear areas, and the left and right areas of the image pickup apparatus 10, which include MIC-FL (Front Left), MIC-FR (Front Right), MIC-RL (Rear Left) and MIC-RR (Rear Right). The microphone amplifier 14 is adapted to amplify analog audio signals from the respective microphone of the microphone group 12. The AD converter 16 is adapted to convert the respective analog audio signals from the microphone amplifier 14 into digital audio signals.

The stereo matrix circuit 18 is adapted to convert the four-channel digital audio signals from the AD converter 16 into 5.1 ch compatible surround signals. In particular, the 5.1 ch compatible surround signals used in the present embodiment corresponds to Dolby Digital, and are composed of six-channel audio signals including a FC (Front Center) channel, a FL (Front Left) channel, an FR (Front Right) channel, an RL (Rear Left) channel, an RR (Rear Right) channel, and an SW (Sub Woofer) channel.

The narration switch 20 is a switch used when a narration of a photographer is recorded during the image pickup. The photographer can arbitrarily operate the narration switch. Through the operation of the narration switch 20, the monophonic circuit 22 is controlled. To be more specific, when the narration switch 20 is OFF, the monophonic circuit 22 outputs the signals RL and RR which are output from the stereo matrix circuit 18 as they are. When the narration switch 20 is ON, the monophonic circuit 22 converts the signals RL and RR which are output from the stereo matrix circuit 18 into a monophonic signal MONO composed of a mixed signal of those signals RL and RR to be output. Hereinafter, the audio signal converted to be monophonic with the left and right audios from the rear channels is referred to as narration monophonic signal herein.

The image pickup apparatus 10 is provided with, in addition to the narration switch 20, a movie recording switch, a release switch, a reproduction switch, a stop switch, a mode dial, and the like. With use of these parts, the photographer can instruct the image pickup apparatus 10 to perform setting of an operation mode (a camera mode, a recording mode, or a reproduction mode), movie recording, still image pickup, movie reproduction, display of thumb nail images, and the like.

The audio encoder 24 compresses and encodes the signals FC, FL, FR, RL, RR, and SW from the stereo matrix circuit 18 as well as the signals RL and RR from the monophonic circuit 22 or the two narration monophonic signals MONO through an audio compression system such as ATRAC (Adaptive TRansform Acoustic Coding) 3 to generate compressed audio data.

Next, a description will be given of the image data. The lenses 50 image an optical image of an object on an imaging plane of the image pickup element 52. The CCD image pickup element 52 is adapted to convert the optical image from the lenses 50 into an electrical signal. It is noted that the image pickup element 52 may be changed into a CMOS (Complementary Metal Oxide Semiconductor) type image pickup element.

The camera signal processing circuit 54 also includes an A/D converter (not illustrated in the drawing). First, the camera signal processing circuit 54 converts an electrical signal from the CCD image pickup element 52 into a digital image signal to execute known signal processes for the camera (for example, gamma correction, color balance adjustment, luminance/color separation), and the like.

The video encoder 56 is adapted to compress and encode the digital image signal from the camera signal processing circuit 54 through an image compression method such as MPEG (Moving Picture Experts Group phase) 2, Motion JPEG, or JPEG2000 to generate the compressed image data.

The recording processing circuit 58 is adapted to record the compressed image data from the video encoder 56 and the compressed audio data from the audio encoder 24 on the recording medium 60. The recording medium 60 is a recordable optical disk complying with the DVD (Digital Versatile Disk) standard but other recordable optical disk medium or magnetic disk medium can also be utilized.

While referring to FIG. 2, a mechanism of the monophonic circuit 22 will be described. The monophonic circuit 22 is composed of a mixing circuit 70, a switching switch 72, a switching switch 74, and an attenuator (ATT) 76.

The mixing circuit 70 is adapted to mix the signals RL and RR from the stereo matrix circuit 18 with each other to be converted into a monophonic signal. The attenuator 76 is adapted to attenuate the output signal of the mixing circuit 70 by a predetermined level. The photographer is positioned in the vicinity of the image pickup apparatus 10. In general, as compared with the audio from the object side, the audio from the photographer is larger. Thus, the audio level of the photographer is decreased by the attenuator 76. The switching switches 72 and 74 respectively select the signals RL and RR from the stereo matrix circuit 18 in a case where the narration switch 20 is OFF. On the other hand, in a case where the narration switch 20 is ON, the switching switches 72 and 74 select the output of the attenuator 76.

In this way, when the narration switch 20 is ON, the monophonic signal obtained by mixing the signal RR with the signal RL, that is, the narration monophonic signal is input to the audio encoder 24 instead of the signals RR and RL. Thus, irrespective of the panning operation of the image pickup apparatus 10, the reproduced audio of the RR channel and that of the RL channel have the same intensity, and the voice of the photographer is localized at a fixed position in the rear area of the image pickup apparatus 10.

A description will be given of a particular operation according to the present embodiment when the narration switch 20 is ON. In the record mode, the microphone group 12 outputs monophonic audio signals to the microphone amplifiers 14. The microphone amplifiers 14 amplify the monophonic audio signals from the microphone group 12. The AD converters 16 convert the monophonic audio signals amplified by the microphone amplifiers 14 into digital audio signals. The stereo matrix circuit 18 converts the four-channel digital audio signals from the microphone amplifiers 14 into 5.1 ch compatible surround signals (FC, FL, FR, RL, RR, and SW). Then, surround signals (FC, FL, FR, and SW) are supplied to the audio encoder 24 and surround signals (RL and RR) are supplied to the monophonic circuit 22.

In the record mode, when the user turns ON the narration switch 20, the switching switches 72 and 74 of the monophonic circuit 22 are switched to the side of the attenuator 76. The mixing circuit 70 mixes the signals RL and RR with each other to generate a narration monophonic signal. The output audio signal of the mixing circuit 70 is attenuated by the attenuator 76 and supplied to the audio encoder 24 via the switching switches 72 and 74.

The audio encoder 24 compresses and encodes the signals FC, FL, FR, and SW from the stereo matrix circuit 18 as well as the signals RL and RR from the monophonic circuit 22 or the narration monophonic signal to be supplied to the recording processing circuit 58. The recording processing circuit 58 records the compressed image data from the video encoder 56 and the compressed audio data from the audio encoder 24 in the recording medium 60.

Figure 3:
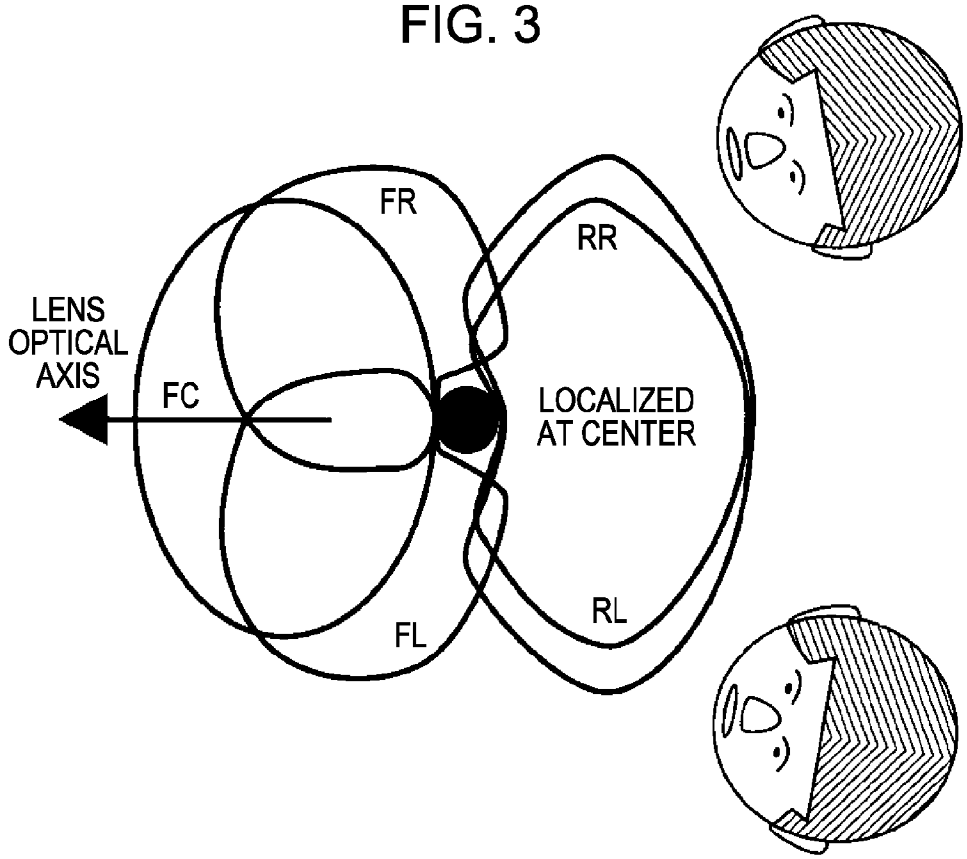
FIG. 3 illustrates a polar pattern example of the present embodiment.

In this manner, according to the present embodiment, when the narration switch 20 is pressed, the conversion into the monophonic signal is performed by mixing the signals of the RL channel and the RR channel with each other and the monophonic signal is. Thus, irrespective of the position of the narrator (the photographer) for the image pickup apparatus 10 during the recording, the reproduced audio of the RL channel and that of the RR channel have the same audio volume during the reproduction. That is, even when the image pickup apparatus 10 is panned during the image pickup, the reproduced audio of the photographer is always localized in the rear area of the image pickup apparatus 10. FIG. 3 illustrates a polar pattern example of the audio signal recorded by the video camera 10 according to the present embodiment.

On the other hand, when the narration switch 20 is not pressed, the audio encoder 24 compresses and encodes six-channel surround signals (FC, FL, FR, RL, RR, and SW) of the stereo matrix circuit 18 as they are, and the recording processing circuit 58 records the compressed image data from the audio encoder 24 in the recording medium 60. Thus, when the narration is recorded while the image pickup apparatus 10 is panned, during the reproduction, an audio image of the narrator reflects the panning of the image pickup apparatus 10 and shifts. Therefore, a viewer suffers an unnatural narration as if the narrator moves around.

Figure 4:
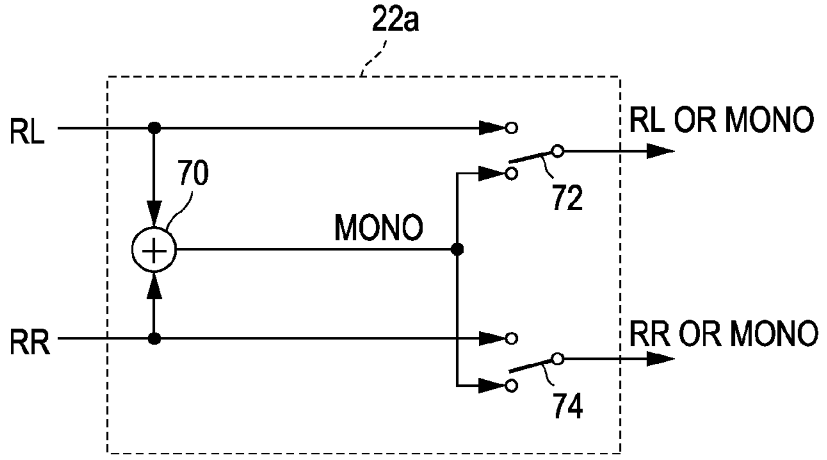
FIG. 4 illustrates another configuration example of the monophonic circuit.

It is to be noted that it is conceivable that the voice of the photographer is closer to the microphone as compared with the audio from the object side in general, and therefore the voice of the photographer tends to be larger than the audio from the object. However, according to the present embodiment, the attenuator 76 is provided in the monophonic circuit 22, the above-described drawback is eliminated. It is noted that such a configuration can also be attained that the volume adjustment is performed during the reproduction instead of during the recording. In that case, the monophonic circuit 22 of FIG. 2 is configured like the monophonic circuit 22*a* of FIG. 4 and the attenuator 76 may be omitted.

Second Exemplary Embodiment

According to the first embodiment, the monophonic circuit 22 or the monophonic circuit 22*a* converts the stereo audio signals to be monophonic from the rear areas (RL and RR) but the narration monophonic signal may be mixed with the stereo signals FL and FR from the front area. With this process, it is possible to suppress the influence caused by the panning of the image pickup apparatus.

Figure 5:
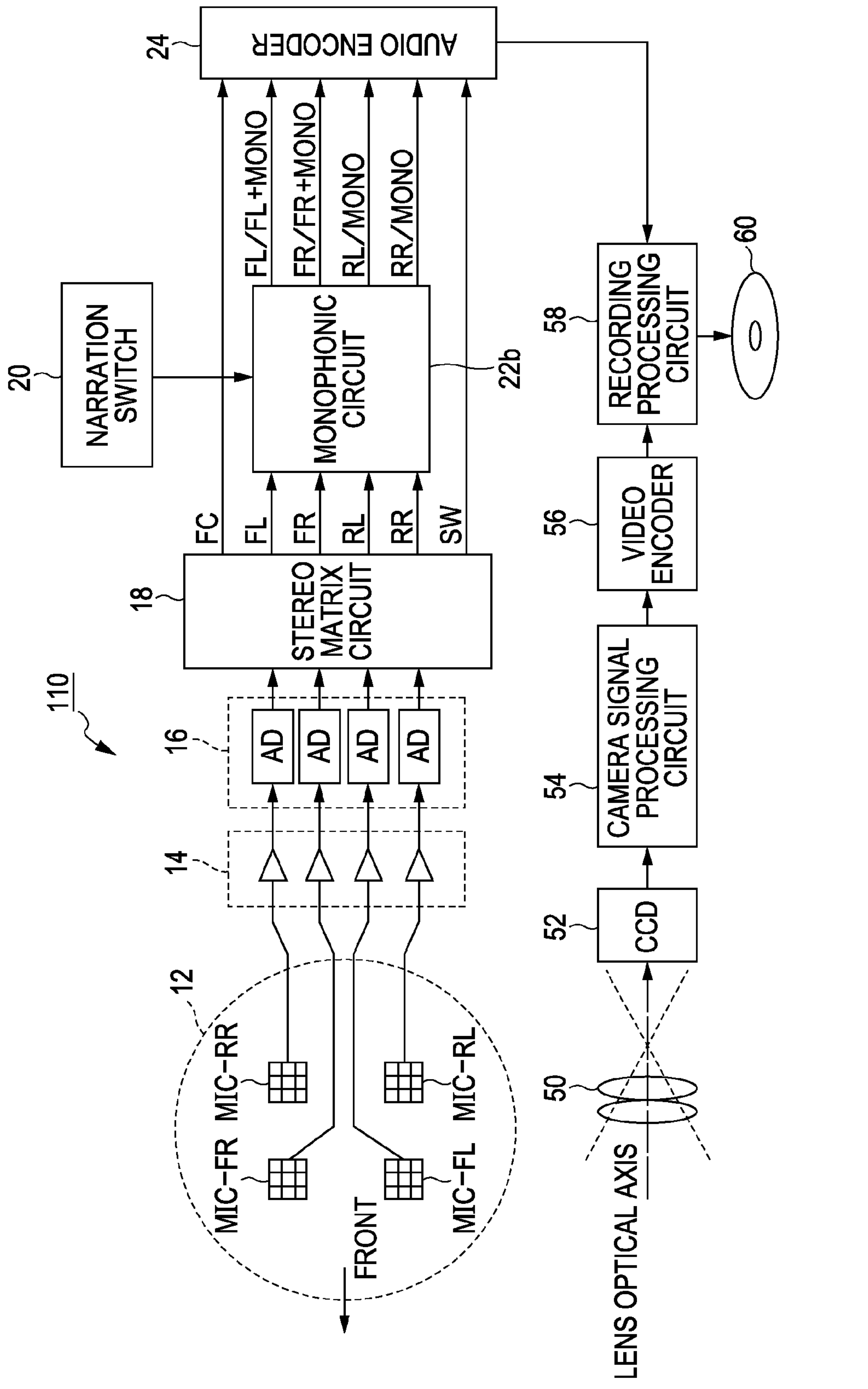
FIG. 5 is a schematic configuration block diagram of an example image pickup apparatus according to a second embodiment of the present invention.
Figure 6:
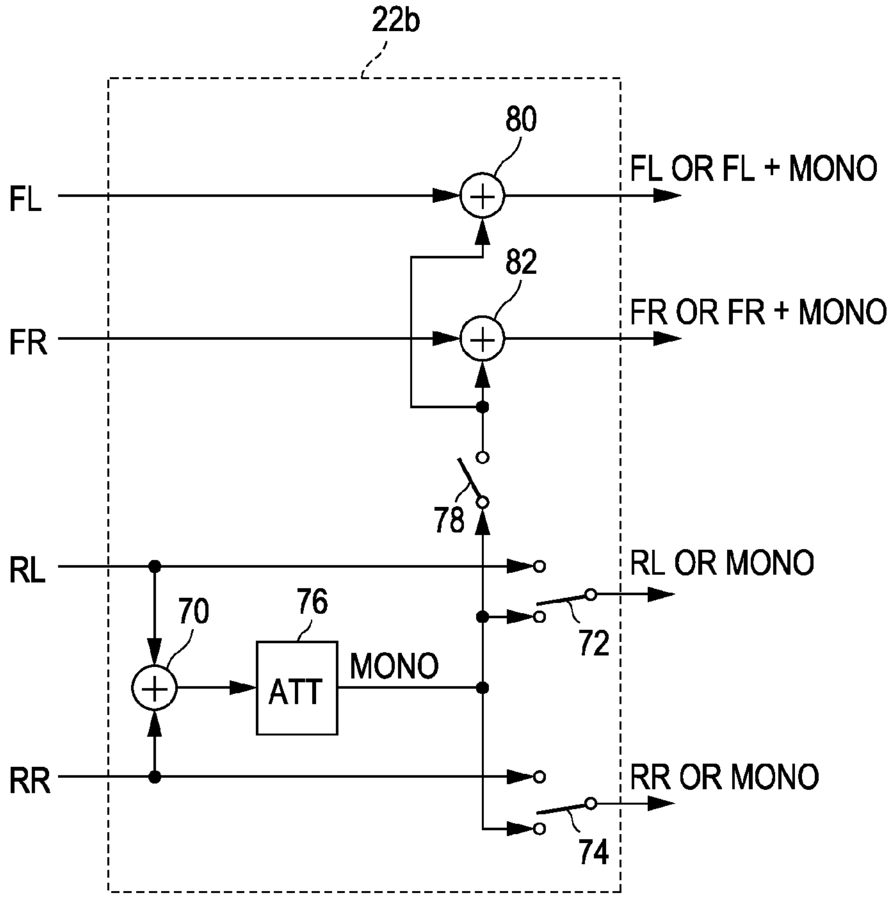
FIG. 6 is a block diagram of an example monophonic circuit according to the second embodiment.

FIG. 5 is a schematic configuration block diagram of the image pickup apparatus changed as described above according to a second embodiment. The same components as those of the first embodiment have the same reference numerals. In an image pickup apparatus 110 illustrated in FIG. 5, the monophonic circuit 22 is changed into the monophonic circuit 22*b*. FIG. 6 is a schematic configuration block diagram of the monophonic circuit 22*b*.

Changed parts of the present embodiment from the above-described embodiment will be described. In addition to the components of the monophonic circuit 22 of FIG. 2A, a configuration of a switch 78, a mixing circuit 80, and a mixing circuit 82 is added to the monophonic circuit 22*b* of the image pickup apparatus 110. The switch 78 is closed when the narration switch 20 is ON and opened when the narration switch 20 is OFF. The mixing circuit 80 mixes the narration monophonic signal MONO from the switch 78 with the signal FL. The mixing circuit 82 mixes the narration monophonic signal MONO from the switch 78 with the signal FR.

When the narration switch 20 is ON, the mixing circuit 80 mixes the output signal of the attenuator 76 (the narration monophonic signal) with the signal FL to be output, and when the narration switch 20 is OFF, the mixing circuit 80 outputs the signal FL as it is. Similarly, when the narration switch 20 is ON, the mixing circuit 82 outputs a signal obtained by mixing the signal FR with the output signal of the attenuator 76, and when the narration switch 20 is OFF, the mixing circuit 82 outputs the signal FR as it is. In order that the volume of the narration becomes appropriate, an appropriate value of a mixture ratio of the mixing circuits 80 and 82 is set.

As a result, when the narration switch 20 is OFF, the monophonic circuit 22*b* outputs the input signals FL, FR, RL, and RR as they are. When the narration switch 20 is ON, the monophonic circuit 22*b* outputs a signal obtained by mixing the signal FL with the narration monophonic signal to the FL channel, outputs a signal obtained by mixing the signal FR with the narration monophonic signal to the FR channel, outputs the narration monophonic signal to the RL channel, and outputs the narration monophonic signal to the RR channel.

With the monophonic circuit 22*b* illustrated in FIG. 6, for the FR channel and the FL channel as well, the monophonic signal representing the narration of the photographer is mixed. Irrespective of the panning of the image pickup apparatus 10, it is possible to localize the audio image of the photographer in the rear area of the image pickup apparatus.

Third Exemplary Embodiment

Figure 7:
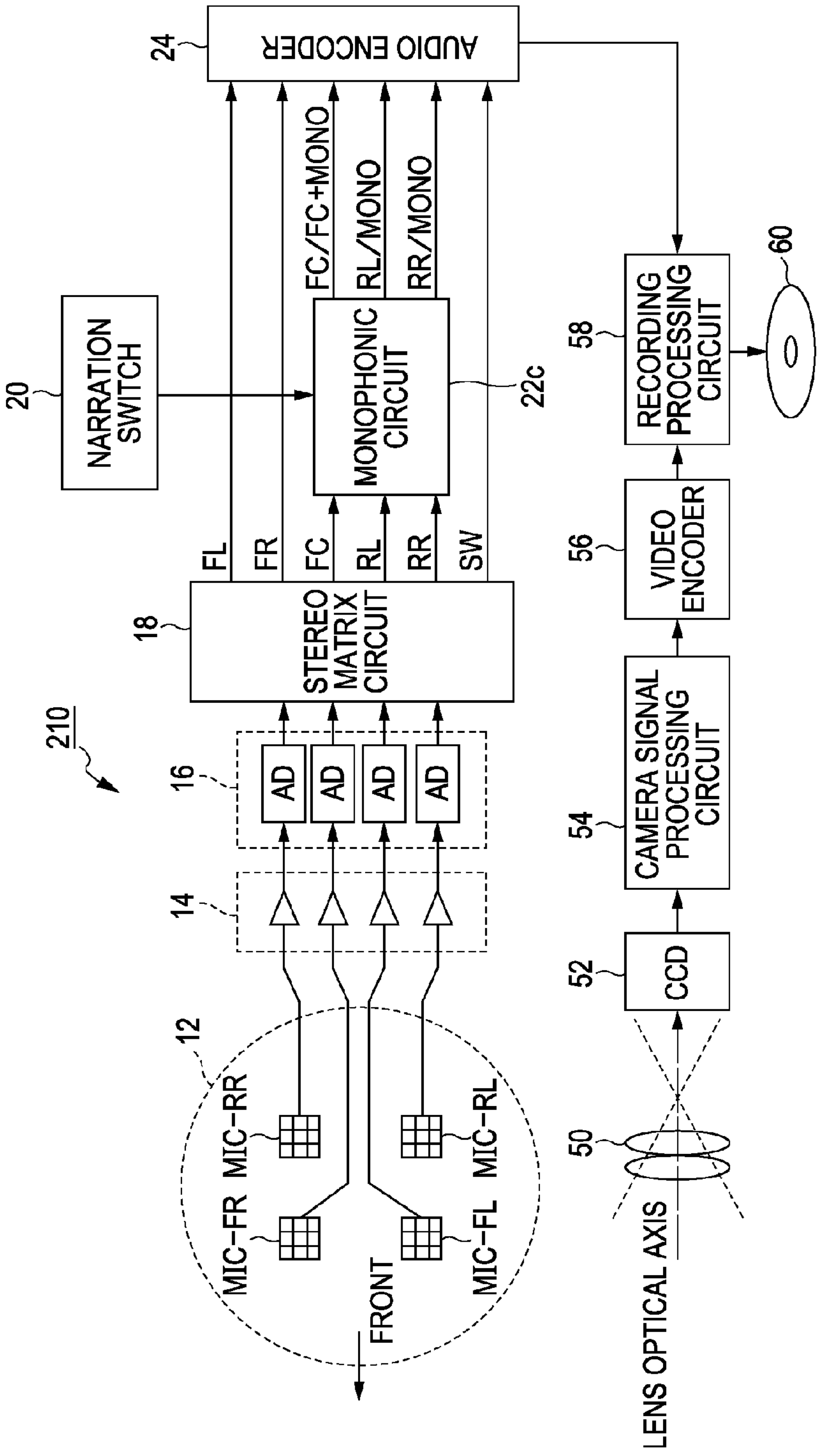
FIG. 7 is a schematic configuration block diagram of an example image pickup apparatus according to a third embodiment of the present invention.

FIG. 7 is a schematic configuration block diagram of an image pickup apparatus according to a third embodiment.

Figure 8:
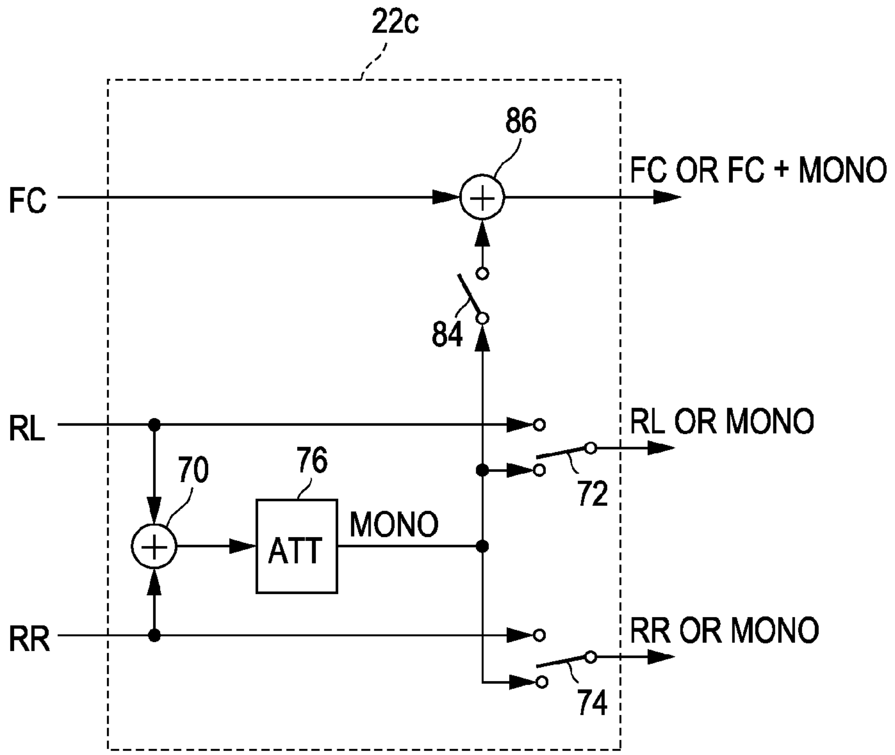
FIG. 8 is a block diagram of an example monophonic circuit according to the third embodiment.

The same reference numerals are allocated to the same components as those of the first and second embodiments. In an image pickup apparatus 210 of the present embodiment, instead of the monophonic circuit 22, a monophonic circuit 22*c* is arranged. The monophonic circuit 22*c* has a function of mixing the narration monophonic signal MONO with the front channel FC during the narration in addition to the functions of the monophonic circuit 20. With this process as well, it is possible to suppress the influence caused by the panning of the image pickup apparatus. FIG. 8 is a schematic configuration block diagram of the monophonic circuit 22*c*.

Changed parts of the present embodiment from the above-described embodiments will be described. The monophonic circuit 22*c* is further provided with a switch 84 which is closed when the narration switch 20 is ON and is open when the narration switch 20 is OFF and mixing circuit 86 adapted to mix the signal FC with the narration monophonic signal MONO from the switch 84 in addition to the components of the monophonic circuit 22.

When the narration switch 20 is ON, the mixing circuit 86 outputs a signal obtained by mixing the signal FC with the output signal of the attenuator 76 the narration monophonic signal). When the narration switch 20 is OFF, the mixing circuit 86 outputs the signal FL as it is. In order that the volume of the narration becomes appropriate, an appropriate value of a mixture ratio of the mixing circuit 86 is set.

As a result, when the narration switch 20 is OFF, the monophonic circuit 22*c* outputs the input signals FC, RL, and RR as they are. When the narration switch 20 is ON, the monophonic circuit 22*c* outputs a signal obtained by mixing the signal FC with the narration monophonic signal to the FC channel, outputs the narration monophonic signal to the RL channel, and outputs the narration monophonic signal to the RR channel.

With the monophonic circuit 22*c* illustrated in FIG. 8, for the FC channel that is the audio from the front area as well, the monophonic signal representing the narration of the photographer is mixed. Irrespective of the panning of the image pickup apparatus 10, it is possible to localize the audio image of the photographer in a fixed position with respect to the image pickup apparatus.

Also, unlike the second and third embodiments, for example, all the channels other than the rear channels such as the FL, FR, and FC channels may output a signal obtained by mixing the signal that should be originally input with the narration monophonic signal.

Fourth Exemplary Embodiment

Figure 9:
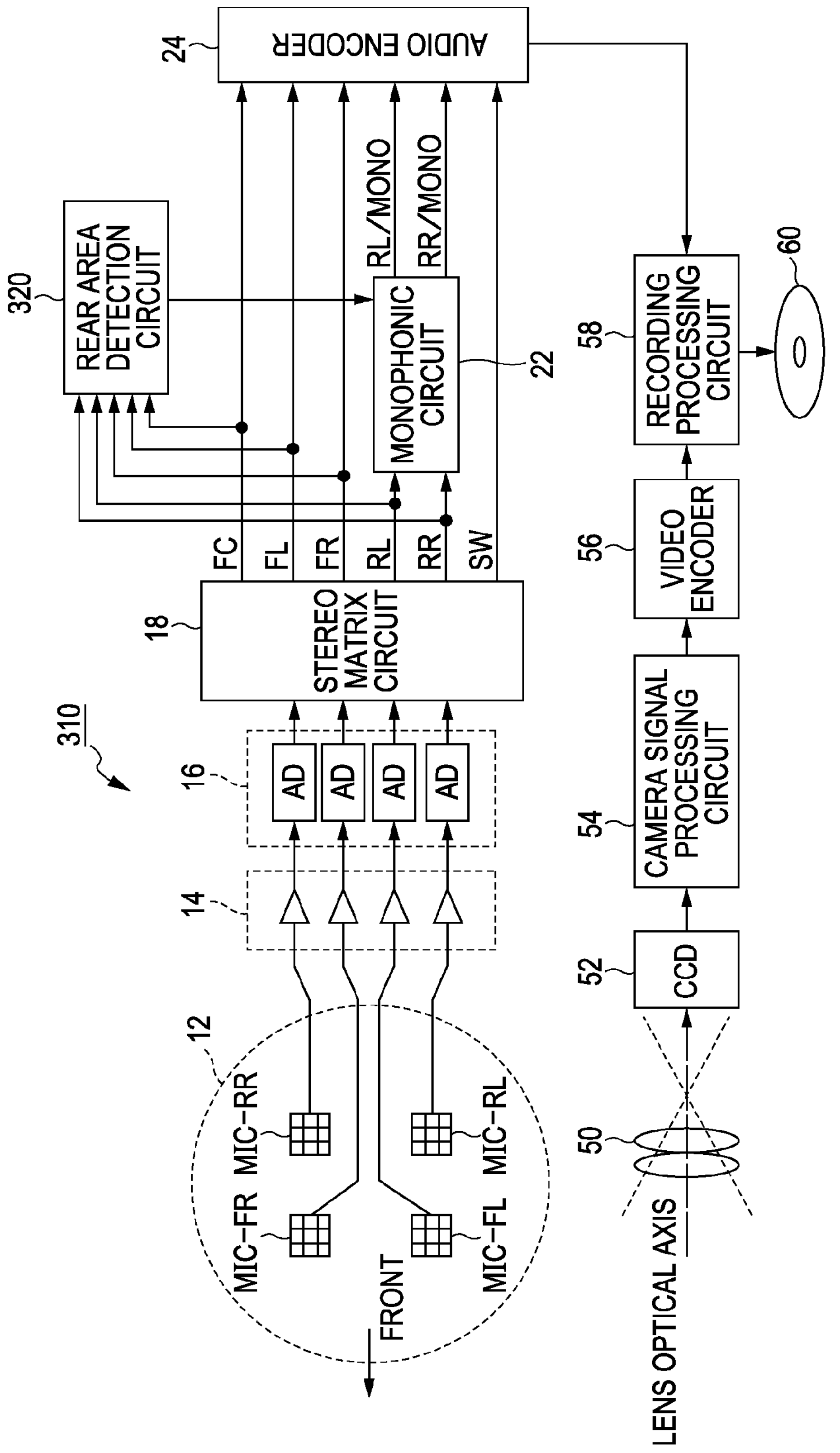
FIG. 9 is a schematic configuration block diagram of an example image pickup apparatus according to a fourth embodiment of the present invention.
Figure 10:
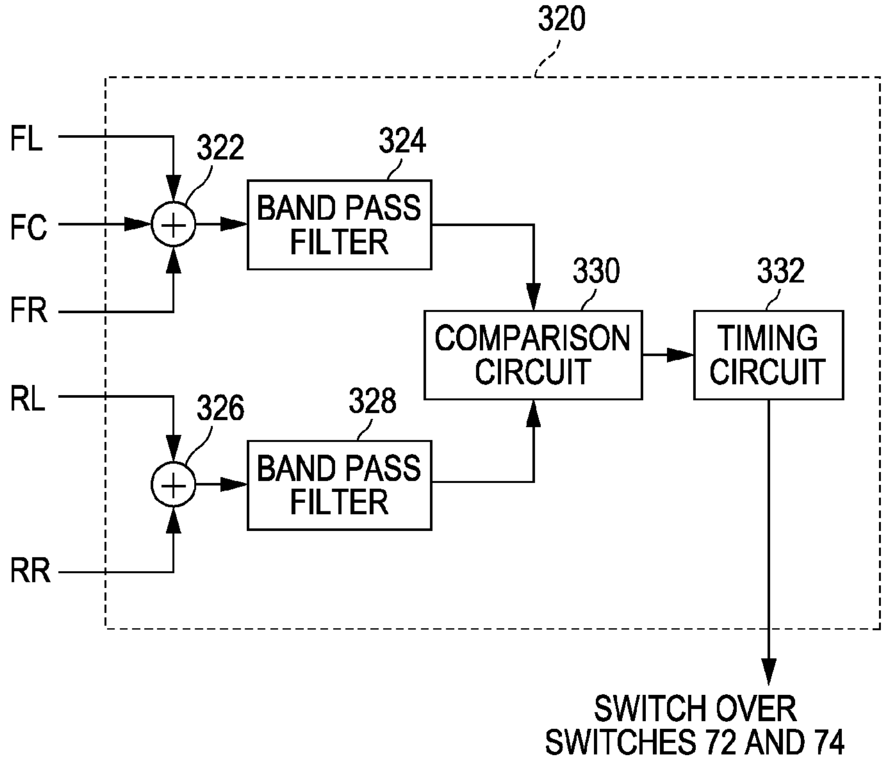
FIG. 10 is a schematic configuration block diagram of an example rear detection circuit according to the fourth embodiment.
Figure 11:
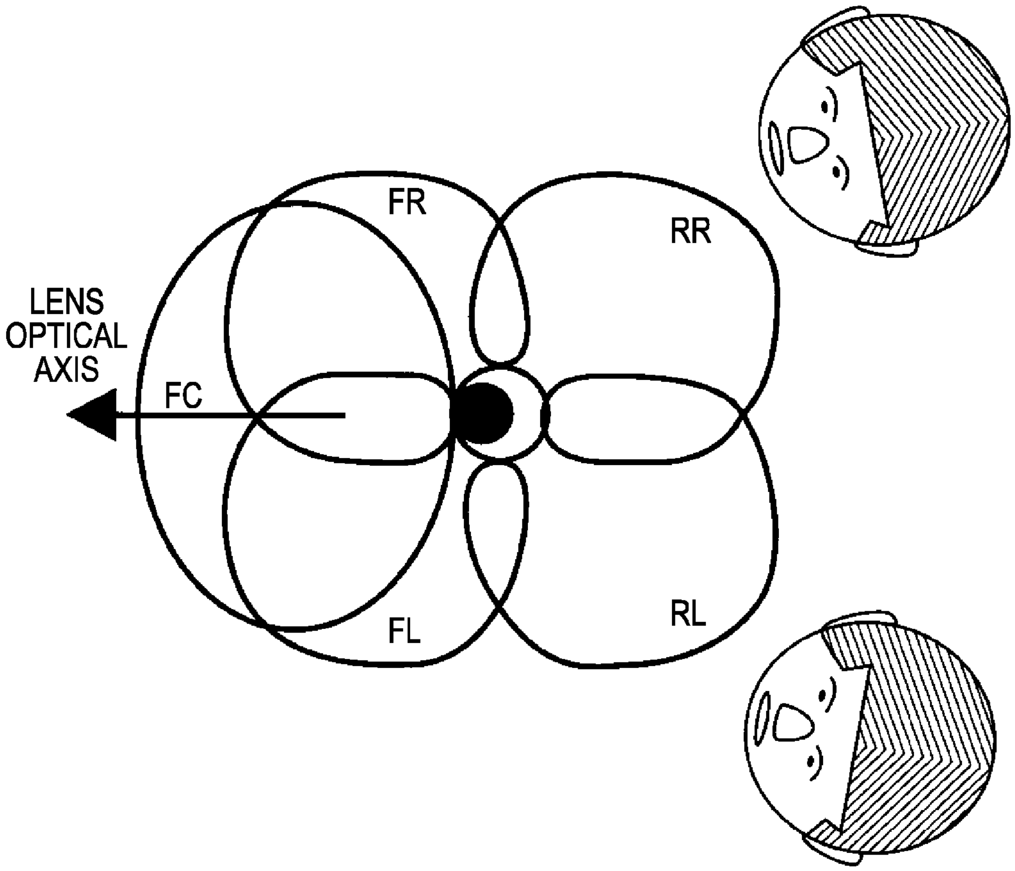
FIG. 11 PRIOR ART
FIG. 11 illustrates a conventional 5.1 ch polar pattern.
Figure 12:
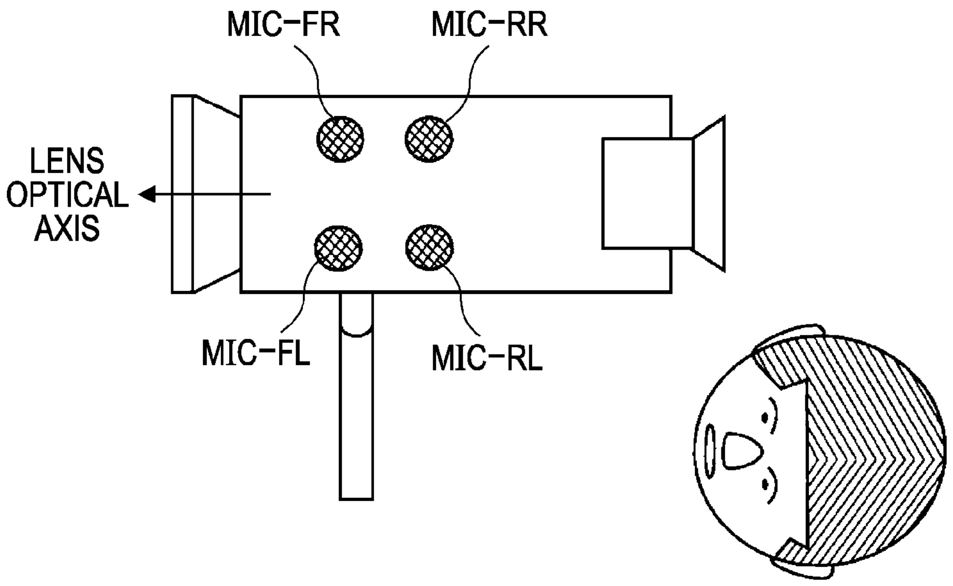
FIG. 12 PRIOR ART
FIG. 12 is a schematic diagram of a horizontal positional relation between a camera and a photographer during a normal image pickup.
Figure 13:
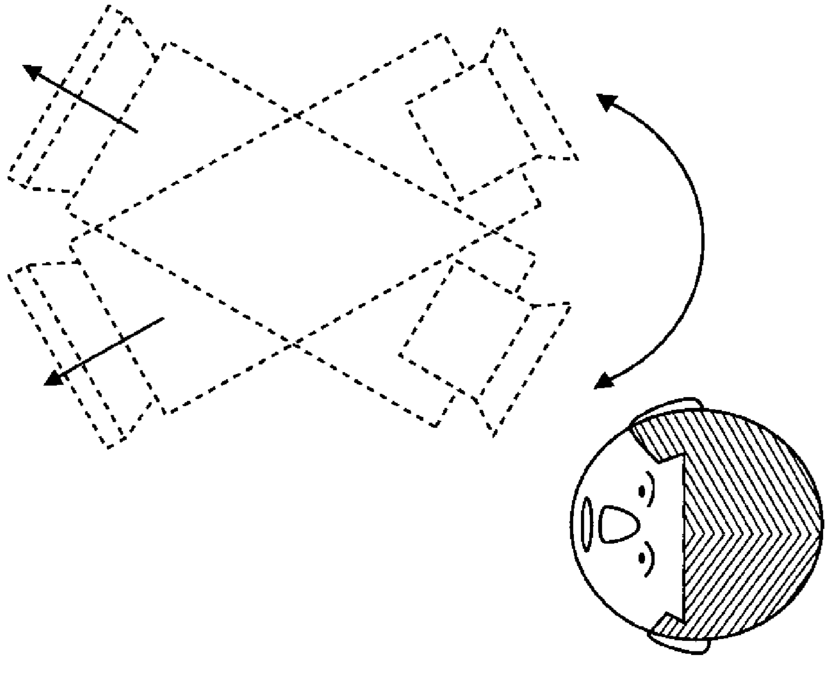
FIG. 13 PRIOR ART
FIG. 13 is a schematic diagram of a horizontal positional relation between the camera and the image pickup when the camera is panned.

Next, a description will be given of a fourth embodiment in which the monophonic circuit 22 is automatically controlled even when the user does not press the narration switch 20. FIG. 9 is a schematic configuration block diagram of an image pickup apparatus 310 according to the fourth embodiment. In the image pickup apparatus 310, a rear area detection circuit 320 is provided instead of the narration switch 20. FIG. 10 is a schematic configuration block diagram of the rear area detection circuit 320. The same reference numerals are allocated to the same components as those of the first embodiment.

The rear area detection circuit 320 of the image pickup apparatus 310 is provided with mixing circuits 322 and 326, band pass filters 324 and 328, a comparison circuit 330, and a timing circuit 332. The rear area detection circuit 320 is adapted to detect an audio input state from the rear area on the basis of five-channel audio signals (FC, FL, FR, RL, and RR) of the front, front left and right, and rear left and right areas from the stereo matrix circuit 18.

The mixing circuit 322 mixes the signals FC, FL, and FR from the stereo matrix circuit 18 one another. The band pass filter 324 extracts a predetermined band component (approximately 200 Hz to 5 kHz) such as a band component from a human being on the basis of the output from the mixing circuit 322. The mixing circuit 326 mixes the signals RL and RR from the stereo matrix circuit 18 with each other. The band pass filter 328 extracts a predetermined band component (approximately 200 Hz to 5 kHz) such as a band component from a human being on the basis of the output from the mixing circuit 326. The pass bands of the band pass filters 324 and 328 may be set identical to each other.

The comparison circuit 330 compares absolute values of output signal levels of the band pass filters 324 and 328 with each other. For example, when the output signal level of the band pass filter 328 is larger than the output signal level of the band pass filter 324, it is conceivable that the photographer makes a voice from the rear area of the image pickup apparatus 10. In this case, the comparison circuit 330 supplies a signal H to the timing circuit 332. In contrast, when the output signal level of the band pass filter 328 is equal to or lower than the output signal level of the band pass filter 324, the comparison circuit 330 supplies a signal L to the timing circuit 332.

When the output signal of the comparison circuit 330 is H, the timing circuit 332 supplies a control signal for turning ON the switches 72 and 74 of the monophonic circuit 22 to the monophonic circuit 22. When the output signal of the comparison circuit 330 is L, the timing circuit 332 supplies a control signal for turning OFF the switches 72 and 74 of the monophonic circuit 22 to the monophonic circuit 22. In order to avoid chattering of the switches 72 and 74, switching of the switches 72 and 74 may have hysteresis property. For example, the following configuration may be adopted. When the output signal of the comparison circuit 330 is shifted from L to H, the timing circuit 332 supplies the control signal for turning ON the switches 72 and 74 of the monophonic circuit 22 for a predetermined time to the monophonic circuit 22. After elapse of the predetermined time, in accordance with the shift of the comparison circuit 330 from H to L, the timing circuit 332 supplies the control signal for turning OFF the switches 72 and 74 of the monophonic circuit 22.

In this manner, according to the present embodiment, with use of the rear area detection circuit 320, the conversion into the monophonic signals of the audios of the rear left and right areas is controlled depending on the presence or absence of the audio from the rear area of the image pickup apparatus 300. Therefore, it is possible to record the audio of the narration with reliability during the narration so as to be localized to the predetermined position of the image pickup apparatus 300.

Fifth Exemplary Embodiment

In the first to fourth embodiments, the process for recording a 5.1 ch audio has been described. According to the present embodiment, a process for reproducing a 5.1 ch audio will be described.

Figure 14:
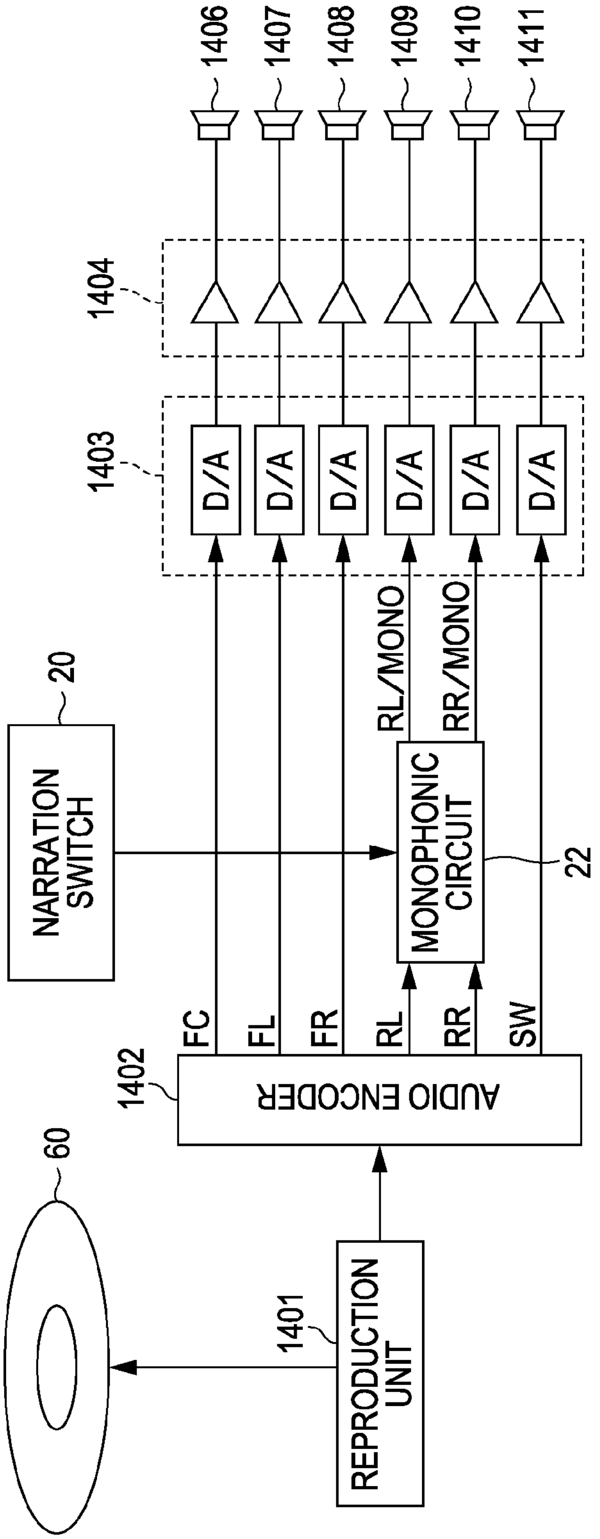
FIG. 14 is a schematic configuration block diagram of a reproduction apparatus according to a fifth embodiment of the present invention.

FIG. 14 illustrates an audio reproduction apparatus capable of reproducing a 5.1 ch audio. In FIG. 14, a reproduction unit 1401 reproduces audio compression data from the recording medium 60. An audio decoder 1402 decodes the reproduced audio compression data and converts the data in 5.1 ch compatible surround signals. A DA conversion unit 1403 convert the converted 5.1 ch compatible surround signal from the digital signal into an analog signal for each channel. An amplifier unit 1404 amplifies the analog signal that has been converted for each channel. Then, speaker units 1406 to 1411 reproduce the amplified monophonic audio signals. Herein, the speaker 1409 to which the RL signal is input is a rear left speaker and the speaker 1410 to which the RR signal is input is a rear right speaker.

In a case where the user desires to listen to the narration audio with priority when the narration audio is recorded in the reproduced audio, the user operates the narration switch 20. In a case where the narration switch 20 is operated, the monophonic circuit 22 converts the signals RL and RR that are output from the stereo matrix circuit 18 into the monophonic signal MONO that is a mixed signal of the signals RL and RR for output.

With this configuration, the user can view the narration with priority during the reproduction.

Also, according to the present embodiment, the signals FL and FR that are stereo audios from the front area may be mixed with the narration monophonic signal with use of the monophonic circuit 22*b*. Furthermore, by using the monophonic circuit 22*c*, the narration monophonic signal MONO may be mixed with the front channel FC.

Moreover, with use of the rear area detection circuit 320 instead of the narration switch 20, the rear area audio level is compared with the front area audio level on the basis of the reproduced 5.1 ch compatible surround audio signal. When the rear area audio level is larger, the monophonic circuit 22 may be operated. With this configuration, the audio can be automatically analyzed to generate the narration monophonic signal and the reproduction can be performed even when the user does not operate the narration switch, which improves the usability.

According to the present embodiment, reference numerals 1406 to 1411 denote the speakers but of course may denote terminals for speaker connections. In addition, according to the above-described embodiment, video information may be reproduced along with the audio information.

According to each of the above-described embodiments, the description has been given while using the example of the 5.1 ch compatible surround signal, but the present invention may be applied to 6.1 ch, 7.1 ch, or the like. In other words, the number of pieces of the rear area audio information may be two or higher, and the information may include audio information of upper, lower, left, and right directions in addition to the front area audio information. In this case, it is possible to generate the narration monophonic signal in which all the rear area audio signals are mixed one another to be mixed with the front area audio signal or mixed with the audio information of upper, lower, left, and right directions. Also, according to the present embodiment, the description has been made while using the example of the four microphones, but the similar effect can be attained with a case of three or five microphones.

In addition, the present invention can be of course achieved by supplying a storage medium on which a software program code for realizing the above-described embodiments is recorded to a system or an apparatus, and reading and executing the program code stored on the storage medium by a computer (or a CPU or an MPU) of the system or the apparatus.

In this case, the program code itself read out from the storage medium realizes the functions of the above-described embodiments, and the storage medium on which the program code are stored constitutes the present invention.

For the storage medium for supplying the program code, for example, a flexible disk, a hard disk drive, an optical disk, an opto-magnetic disk, a CD-ROM, a CD-R, a magnet tape, a non-volatile memory card, a ROM, or the like may be used.

In addition, the present invention of course includes not only a case where the program code read out by the computer is executed to realize the functions of the above-described embodiments but also a case where a part or all of the actual process is performed by an operation system (OS) running on the computer in accordance with an instruction of the program code and the process realizes the functions of the above-described embodiments.

Furthermore, the present invention of course includes a case where after the program code read out from the storage medium is written in a memory that is provided to a function expansion board inserted in the computer or a function expansion unit connected to the computer, in accordance with an instruction of the program code, a CPU or the like provided to the function expansion board or the function expansion unit performs a part or all of the actual process and the functions of the above-described embodiments are realized by the process.

The present invention is not limited to the above embodiments and various changes and modifications can be made within the spirit and scope of the present invention. Therefore, to apprise the public of the scope of the present invention, the following claims are made.

This application claims the benefit of Japanese Application No. 2006-230215 filed Aug. 28, 2006, which is hereby incorporated by reference herein in its entirety.

What is claimed is:

1. An audio information recording apparatus comprising:

a microphone unit that obtains a plurality of audio signals;

a generator that generates a plurality of audio information based on the plurality of audio signals, wherein the plurality of audio information includes first front audio information, second front audio information, first rear audio information, and second rear audio information; and a recorder that records the audio information output from the generator on a recording medium, wherein, in response to a first mixed signal in which the first front audio information and the second front audio information is mixed being larger than a second mixed signal in which the first rear audio information and second rear audio information is mixed, the generator outputs the first rear audio information and the second rear audio information, wherein, in response to the first mixed signal being smaller than the second mixed signal in which the first rear audio information and the second rear audio information is mixed, the generator generates mixed audio information in which the first rear audio information and the second rear audio information is mixed, and outputs the mixed audio information instead of the first rear audio information and the second rear audio information.

2. The audio information recording apparatus according to claim 1, wherein, in response to a level of predetermined band component of the first mixed signal is smaller than a level of predetermined band component of the second mixed signal, the generator generates the mixed audio information.

3. The audio information recording apparatus according to claim 1, wherein, in case where the generator generates the mixed audio information, the generator mixes the first rear audio information and the second audio information, and attenuates the mixed audio information.

4. The audio information recording apparatus according to claim 1, further comprising an encoder that encodes the audio information output by the generator.

5. The audio information recording apparatus according to claim 1, wherein the microphone unit obtains four-channel signal, wherein the generator generates six-channel audio information.

6. The audio information recording apparatus according to claim 5, wherein the six-channel audio information include a FC (Front Center) channel, a FL (Front Left) channel, a FR (Front Right) channel, a RL (Rear Left) channel, a RR (Rear Right) channel, and a SW (Sub Woofer) channel.

7. The audio information recording apparatus according to claim 1, further comprising an image pickup unit that obtains image data, wherein the recorder records the image data on the recording medium.

8. The audio information recording apparatus according to claim 1, further comprising a reproduction circuit that reproduces the audio information from a recording medium.

9. An audio information recording apparatus comprising:

a microphone unit that collects audios from front and rear areas of the audio information recording apparatus, and obtains a plurality of audio signals; a generator that generates a plurality of audio information from the plurality of audio signals, wherein the plurality of audio information includes first front audio information, second front audio information, first rear audio information, and second rear audio information, wherein, in accordance with a predetermined instruction, the generator outputs mixed audio information in which the first rear audio information and the second rear audio information is mixed, and outputs the mixed audio information instead of the first rear audio information and outputs the mixed audio information instead of the second rear audio information; and a recorder that records the audio information output from the generator on a recording medium.

10. The audio information recording apparatus according to claim 9, wherein, in case where the generator generates the mixed audio information, the generator mixes the first rear audio information and the second audio information, and attenuates the mixed audio information.

11. The audio information recording apparatus according to claim 9, further comprising an encoder that encodes the audio information output by the generator.

12. The audio information recording apparatus according to claim 9, wherein the microphone unit obtains four-channel signal, wherein the generator generates six-channel audio information.

13. The audio information recording apparatus according to claim 12, wherein the six-channel audio information include a FC (Front Center) channel, a FL (Front Left) channel, a FR (Front Right) channel, a RL (Rear Left) channel, a RR (Rear Right) channel, and a SW (Sub Woofer) channel.

14. The audio information recording apparatus according to claim 9, further comprising an image pick up unit that obtains image data, wherein the recorder records the image data on the recording medium.

* * * * *